US012188265B2

(12) United States Patent
Eck et al.

(10) Patent No.: US 12,188,265 B2
(45) Date of Patent: Jan. 7, 2025

(54) EGRESS WINDOW ASSEMBLY

(71) Applicant: Eckco Plastics, Inc., Mishawaka, IN (US)

(72) Inventors: Gary A. Eck, Mishawaka, IN (US); John D. Black, Mishawaka, IN (US)

(73) Assignee: Gary A. Eck, Mishawaka, IN (US)

( * ) Notice: Subject to any disclaimer, the term of this patent is extended or adjusted under 35 U.S.C. 154(b) by 0 days.

(21) Appl. No.: 18/141,254

(22) Filed: Apr. 28, 2023

(65) Prior Publication Data

US 2024/0360700 A1 Oct. 31, 2024

(51) Int. Cl.
*E05B 65/10* (2006.01)
*E06B 1/36* (2006.01)

(52) U.S. Cl.
CPC ............ *E05B 65/1033* (2013.01); *E06B 1/36* (2013.01)

(58) Field of Classification Search
CPC ............................. E05B 65/1033; E05C 9/025
USPC ............................................... 49/141; 292/92
See application file for complete search history.

(56) References Cited

U.S. PATENT DOCUMENTS 4,991,349 A * 2/1991 Barthelemy ............... B60J 1/10 49/504
10,865,592 B2 * 12/2020 Liang ........................ E05C 3/16
2003/0110703 A1 * 6/2003 Kobrehel .................. E05C 5/00 49/394
2010/0270814 A1 * 10/2010 Labarre ............... E05B 47/0012 292/144
2011/0084521 A1 * 4/2011 Shellenberger ............ B60J 1/06 296/193.08
2014/0202084 A1 * 7/2014 Holmes, Jr. ............. E05F 15/72 49/506

* cited by examiner

*Primary Examiner* — Janet M Wilkens
*Assistant Examiner* — Susan M. Heschel
(74) *Attorney, Agent, or Firm* — Crump Law P.C.

(57) ABSTRACT

The egress window assembly uses a three piece window frame design that allows an outer egress frame to be manually separated from the window assembly to provide emergency egress from the vehicle or structure. In addition to the egress window frame, the egress window assembly includes an egress window frame, an interior window frame, an exterior window frame and a release mechanism that detachably secures the egress frame to the exterior window frame. The release mechanism uses rotating handles on the interior window frames and internal slides bars that shift between the locked and unlocked positions that free the egress frame from the egress window assembly.

26 Claims, 7 Drawing Sheets

EGRESS WINDOW ASSEMBLY

This invention relates to an egress window assembly used in recreational vehicles, trailers, prefabricated buildings, and similar light weight structures, and in particular an egress window assembly using a three piece window frame design.

BACKGROUND AND SUMMARY OF THE INVENTION

Egress windows are common features on recreational vehicles, trailers, prefabricated buildings, and similar light weight structures. Conventional window assemblies for recreational vehicles and prefabricated structures include two half frames that fit into the window openings and sandwich the wall panels there between. Screws and other fasteners are used to secure the two frame halves together so that the window assembly can be taken apart in order to replace the broken or cracked window panes.

Egress window assembly of this invention uses a three piece window frame design that allows an outer egress window frame to be manually separated from the window assembly to provide emergency egress from the vehicle or structure. In addition to the egress window frame, the egress window assembly includes an interior and exterior frame that is seated within the window opening and a release mechanism that detachably secures the egress frame to the exterior window frame. The release mechanism uses rotating handles on the interior window frames and internal slide bars that shift between locked and unlocked positions that free the egress frame from the egress window assembly. The egress window frame carries the various fixed and sliding window panes of the window assembly independently of the interior and exterior window frames.

The three piece frame design allows the window assembly to be easily installed, repaired and replaced within the structure. The design also allows egress frames to accommodate a variety of fixed and sliding window panes. The release mechanism is housed internally between the interior and exterior frames and provides a simpler, more reliable and light weight egress mechanism than conventional egress window assemblies.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

In the following detailed description of the preferred embodiment, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
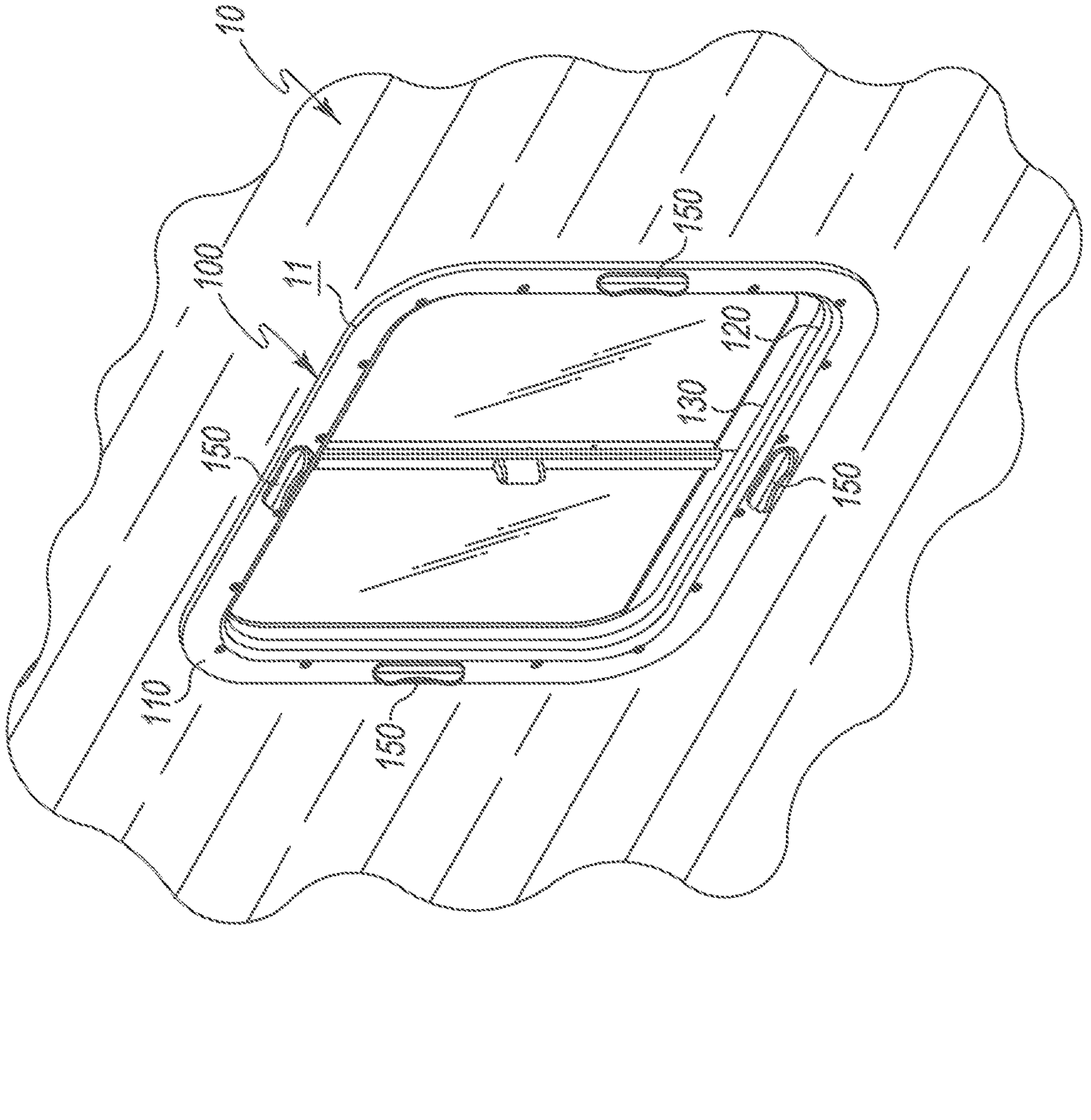
FIG. 1 is a perspective view of an embodiment of the egress window assembly of this invention fitted to an exemplary wall panel.
Figure 2:
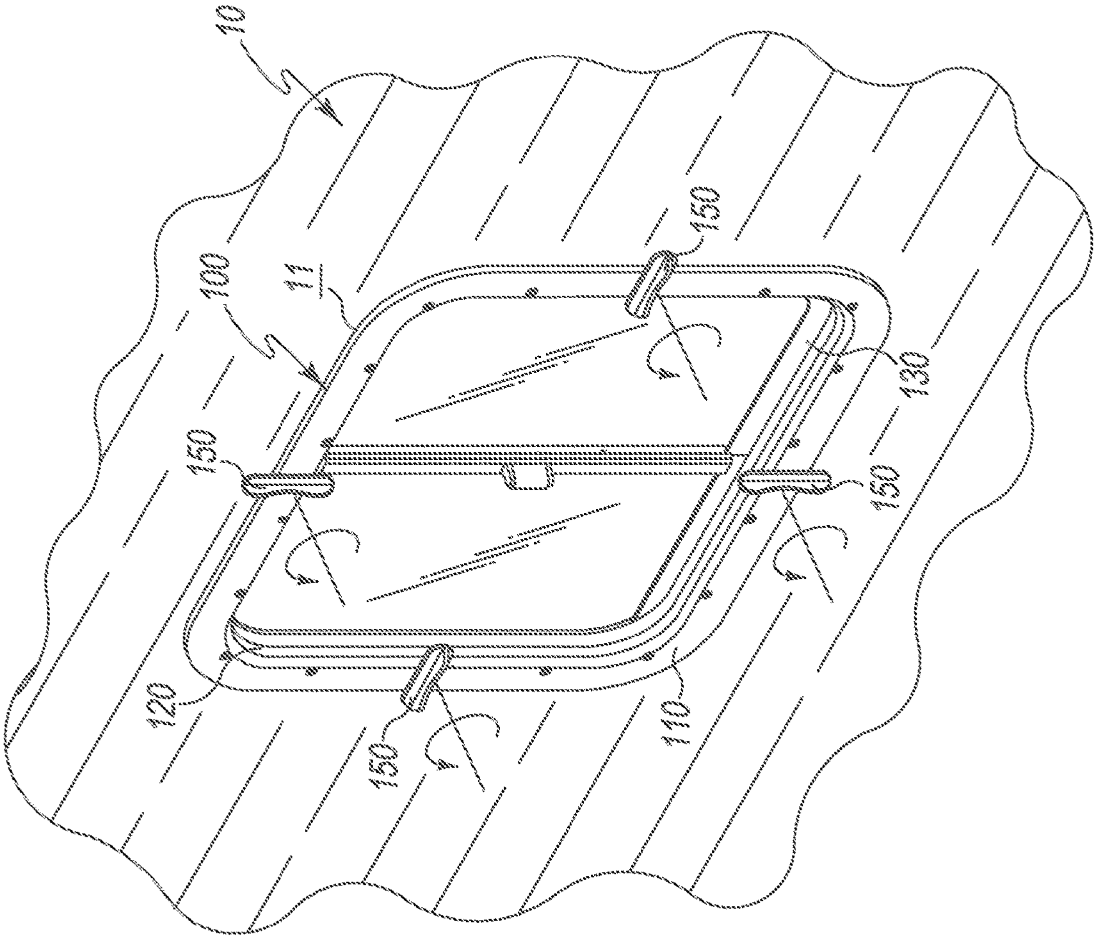
FIG. 2 is a perspective view of the egress window assembly of FIG. 1 showing the release handles rotating to the unlocked position.
Figure 3:
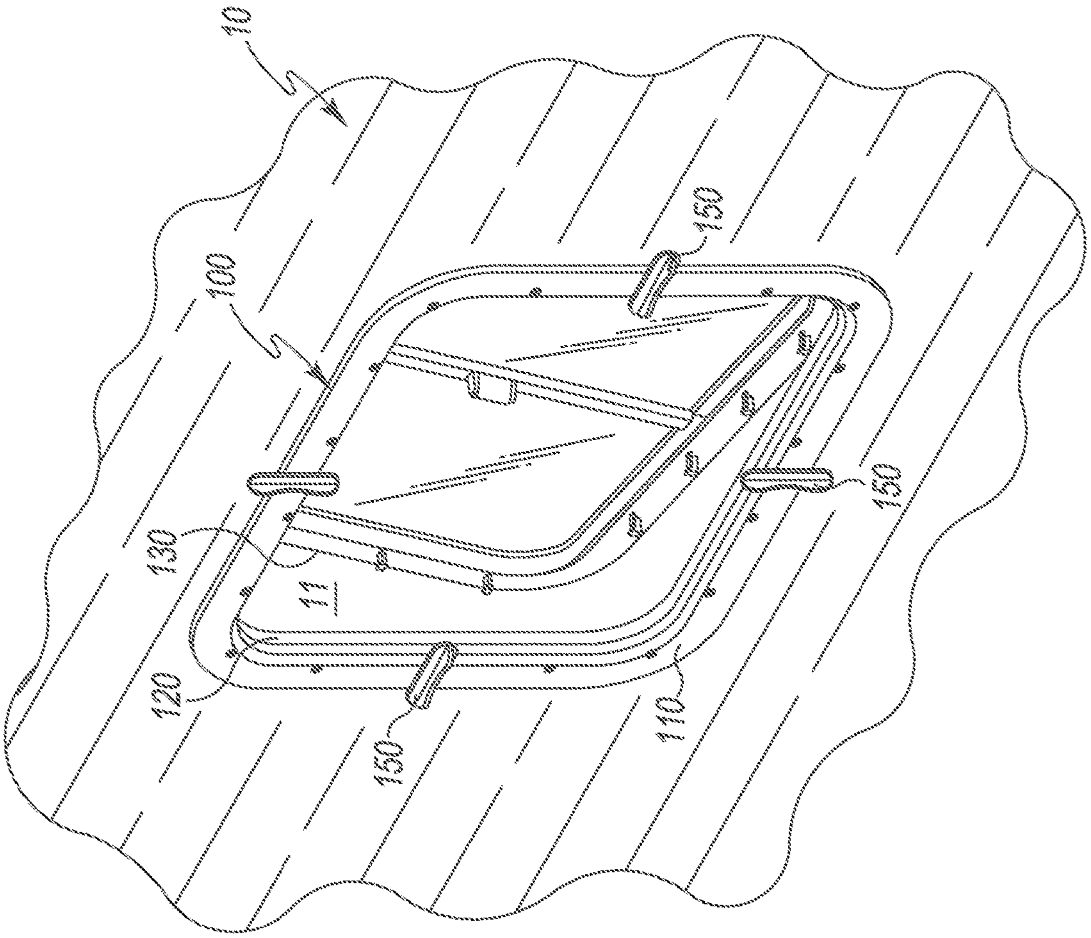
FIG. 3 is a perspective view of the egress window assembly of FIG. 1 showing the release handles rotated to the unlocked position and the egress window frame pushed from the exterior window frame.
Figure 4:
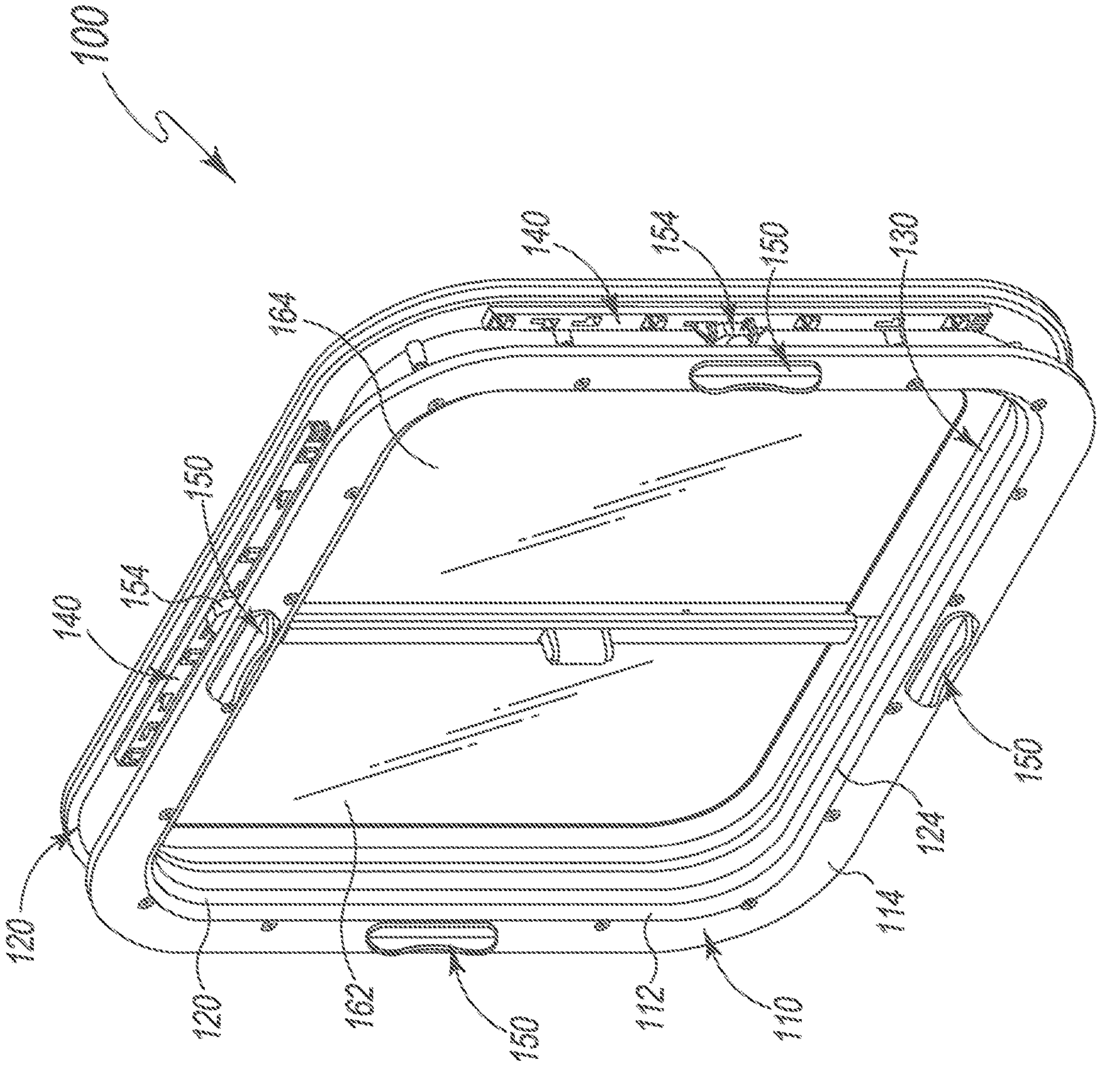
FIG. 4 is a perspective view of the egress window assembly.
Figure 5:
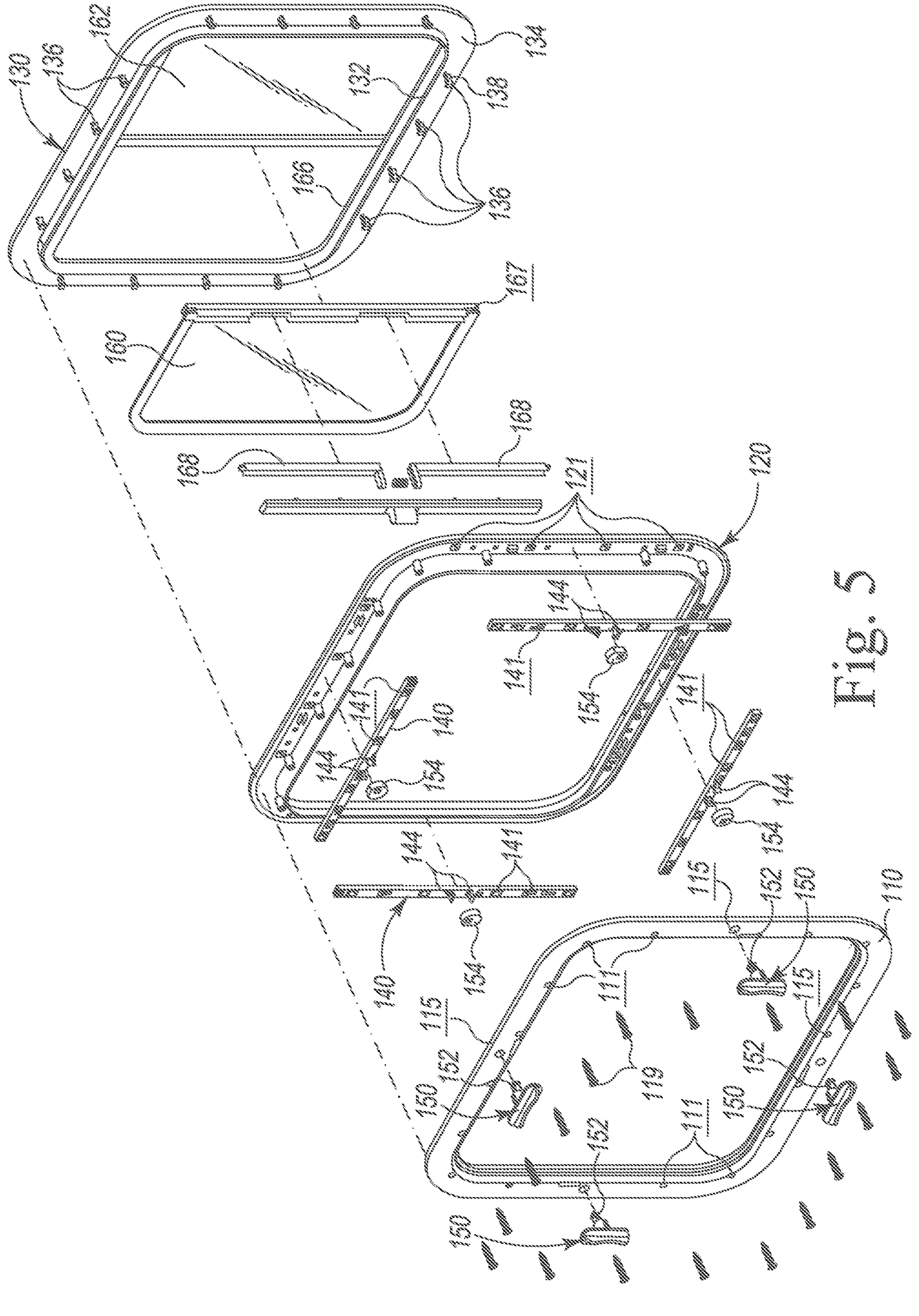
FIG. 5 is an exploded view of the egress window assembly.
Figure 6:
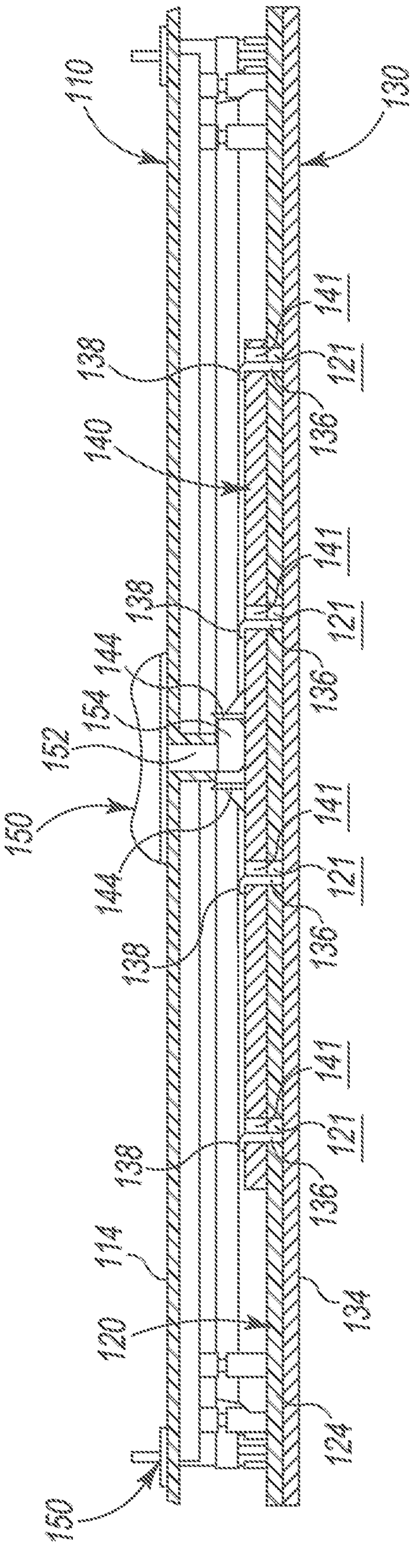
FIG. 6 is a side sectional view of the egress window assembly showing the slide bars in the locked position.
Figure 7:
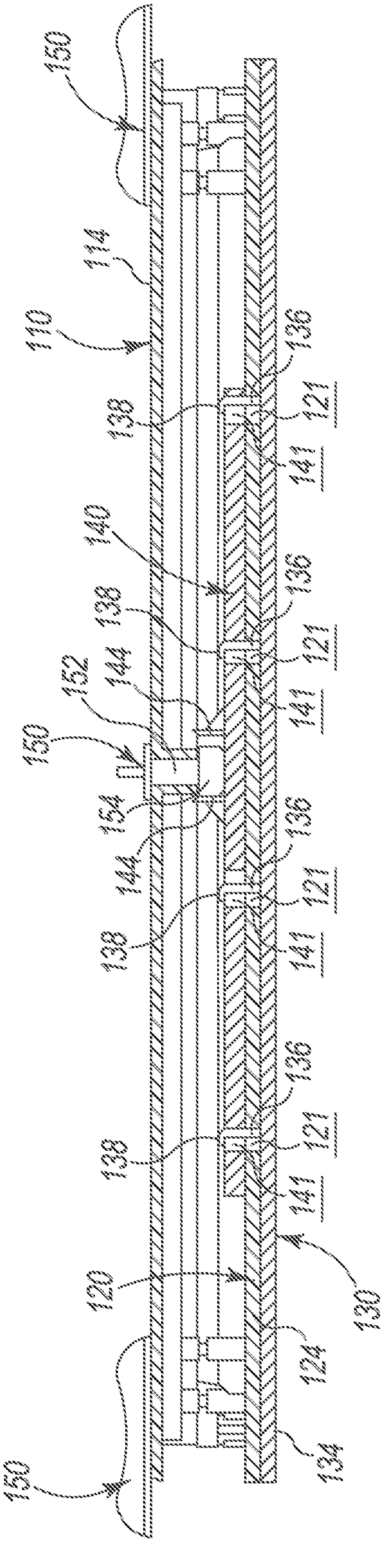
FIG. 7 is a side sectional view of the egress window assembly showing the slide bars in the unlocked position.

Referring now to the drawings, FIGS. 1-7 illustrate an embodiment of the window assembly of this invention, designated generally as reference numeral 100. For ease of explanation, egress window assembly 100 is illustrated and described hereinafter mounted within a rectangular opening 11 in an exemplary wall panel 10 of a fixed structure or vehicle. As shown, egress window assembly 100 is illustrated having a rectangular configuration to fit into a rectangular opening, but in other embodiments, the egress window assembly may take other shapes and be configured to fit into any shaped or sized opening in the wall or door panel within the teaching of this invention.

Egress window assembly 100 is also illustrated used with a conventional monocoque laminate wall panel. Monocoque laminate structural panels are commonly used for wall panels and doors in recreational vehicles, trailers, prefabricated buildings, and similar lightweight structures. Monocoque laminate wall panels have an internal wood or metal skeleton and an insulated core sandwiched between outer panel skins. Monocoque laminate wall panels are lightweight, thin and sturdy and have finished skin surfaces. Again, the teachings of this invention are applicable for use in other types of wall and door construction.

Egress window assembly 100 includes an interior window frame 110, an exterior window frame 120 and an egress window frame 130. Interior window frame 110 and exterior window frame 120 are generally rectangular. Window frames 110, 120 and 130 are ideally formed, molded or otherwise fabricated from a suitable plastic. The construction material is selected to provide sufficient strength and durability to window assembly 100, as well as provide sufficient weight saving over metal frames. Window frames 110 and 120 are complementary and configured to fit their intended opening and as shown have a generally rectangular configuration.

Interior window frame 110 includes a flat peripheral sill flange 112 and a peripheral skirt flange 114. Window skirt flange 114 abuts and overlies the interior side of wall panel 10 when window assembly 100 is seated within window opening 11. Exterior window frame 120 is similar in configuration to interior window frame 110. Again, exterior window frame 120 includes a flat peripheral sill flange 122 and a peripheral skirt flange 124. Again, flat peripheral skirt flange 124 abuts and overlies the exterior side of wall panel 10 when egress window assembly 100 is seated within the window opening. Skirt flange 124 also has a plurality of lock post openings 121 spaced around the perimeter of exterior frame 120.

Window frames 110 and 120 are permanently fitted within the opening 11 on opposites sides of wall 10 and secured together with fasteners 119. Various gaskets and seals (not shown) are used between interior frame 110, exterior frame 120 and wall panel 10 to seal egress window assembly 100 within the opening. Peripheral sill flanges 112 and 122 abut so that window frames 110 and 120 enclose the edges of window opening 11. Window frame 110 and 120 are secured together by fasteners 119 threaded into aligned fastening bosses formed around the edges of the window frames.

Egress frame 130 is similar in construction as interior and exterior frames 110 and 120. Egress window frame 130 includes a flat peripheral sill flange 132 and a peripheral skirt flange 134. Skirt flange 134 is configured to detachably mount against exterior window frame 120. Egress frame 130 has a plurality of lock posts 136 extending perpendicularly around the perimeter of the interior face of skirt flange 134. Lock posts 136 are configured, dimensioned and spaced to extend through lock post openings 121 in exterior window frame 120 when egress frame 130 is attached to egress window assembly 100. As shown, each lock post 136 terminates in a head 138.

Egress frame 130 is detachably mounted to exterior frame 120. Egress window assembly 100 also includes a release mechanism that allows egress frame 130 to be manually uncoupled and pushed from exterior window frame 120. The release mechanism includes four slide bars 140, and four release handles 150. Slide bars 140 are disposed between the skirt flanges 114 and 124 of interior and exterior window frames 110 and 120 when the egress window assembly 100 is fitted to wall 10. Slide bars 140 are elongated rails shiftably carried on the inner face of skirt flange 124 along all four sides of exterior frame 120. Each slide bar 140 can be laterally shifted along the lengths of all four sides of the window assembly by rotation of the release handles 150 between a locked position and an unlocked position. Each slide bar 140 has two or more longitudinal slide slots 141 spaced along the length of the rail to each receive lock posts 136 of egress frame 130. Slide slots 141 align with lock post openings 121 in skirt flange 124 of exterior window frame 120. Each slide 140 also has a pair of spaced cam flanges 144. Each release handle 150 has a shaft 152 that extends through central bores 115 in interior window frame 110. Each handle shaft 152 is operatively connected to cam 154, so that the cams rotate with the manual rotation of release handles 140. Cams 154 are rotatably seated between capture flanges 144 of each slide 140.

Egress frame 130 is detachably affixed to window assembly 100 and held against exterior window frame 120 by the restrictive engagement of lock posts 136 and slide bars 140. Lock posts 136 extend through aligned lock post openings 121 and slide slots 141 with post heads 138 captured by the ends of the slide slots when slide bars 140 are in the locked position. Manually rotating each release handle 150, laterally shifts slide bars 140 and allows egress frame 130 to be detached from egress window assembly 100. The rotation of release handles 150 rotates cams 154 and causes slide bars 140 to shift laterally moving post heads 138 out of engagement with the end of slide slot 141. Once slide bars 140 are shifted to the unlocked position, egress frame 130 can be manually pushed away from egress window assembly 100 withdrawing lock posts 136 from slide slots 141 and lock post openings 121.

Egress window frame 130 carries the various fixed and sliding window panes of egress window assembly 100 independently of the interior and exterior window frames 110 and 120. As shown, egress frame 130 supports a fixed window pane 160 and single sliding window pane 162. Other embodiments may have a single fixed window pane that encloses the egress window opening, or multiple sliding panes. Fixed window pane 160 covers approximately half of the window opening of egress frame 130. Sliding window pane 162 slides laterally to an open position overlying the fixed pane 160 and a closed position encases the other half of the window opening. Window panes 160 and 162 are illustrated as a separate single transparent polymer unit; however, the window pane may take a variety of forms in other embodiments as desired for its particular application. Window panes 160 and 162 may be transparent, translucent or opaque, and may be constructed of any suitable material, such as glass or plastic. Sliding pane 162 rides on a peripheral track 166 extends perpendicularly from the inner sill of egress frame 130. Sliding pane 162 has a generally U-shaped, continuous track channel 167 extending perpendicularly along its top, bottom and one of its side edges. Track channel 167 is configured to receive track 166 of egress frame 130 for sliding movement thereon. Sliding pane 162 is locked in a closed position by a pair of spring loaded slide latch bars 168. In other embodiments, egress frame 130 may also accommodate a sliding screen panel (not shown) that rides on a second peripheral track (not shown). In other embodiments, egress frame 130 can carry various window pane configurations and styles to suit the particular need and application.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An egress window assembly adapted to fit into a window opening in a planar panel having an interior panel side and an exterior panel side thereof, the egress window assembly comprising:

- an interior frame part adapted to seat inside the window opening and to abut the interior panel side around the periphery of the window opening;
- an exterior frame part adapted to seat inside the window opening and to abut against the exterior panel side around the periphery of the window opening, the exterior frame part mounted to the interior frame part with the panel interposed there between;
- an egress frame part detachably mounted to the exterior frame part; and
- a release mechanism allowing the egress frame to be manually detached from the exterior frame part, the release mechanism includes a slide bar shiftably carried by the exterior frame part for movement between a locked position and an unlocked position, and a rotatable handle carried by the interior frame part for moving the slide bar between the locked position where the egress frame part is secured to the exterior frame part and unlocked position where the egress frame part can be manually pushed from the exterior frame part, the slide bar is shiftably carried by the skirt flange of the exterior frame part, each of the interior frame part and the exterior frame part has a peripheral sill flange and a peripheral skirt flange.

2. The egress window assembly of claim 1 wherein the egress frame part has a lock post extending through an opening in the exterior frame part and is restrictively captured by the slide bar when the slide bar is in the locked position.

3. The egress window assembly of claim 1 wherein the handle extends through the skirt flange of the interior frame part.

4. The egress window assembly of claim 1 wherein the slide bar is disposed between the interior frame part and the exterior frame part.

5. The egress window assembly of claim 1 wherein the egress frame part carries a window pane.

6. The egress window assembly of claim 1 wherein the handle includes a cam operatively engaged with the slide bar.

7. The egress window assembly of claim 6 wherein the slide bar has a pair of spaced lock flanges, the cam rotatably seated between the pair of spaced lock flanges to shift the slide bar between the locked position and the unlocked position when the handle is manually rotated.

8. An egress window assembly adapted to fit into a window opening in a planar panel having an interior panel side and an exterior panel side thereof, the egress window assembly comprising:

a first frame part adapted to seat within the window opening and to abut against one of the interior panel side and the exterior panel side around the periphery of the window opening;

a second frame part adapted to seat within the window opening and to abut against the other of the interior panel side and the exterior panel side around the periphery of the window opening, the second frame part affixed to the first frame part with the panel interposed there between;

an egress frame part detachably mounted to the second frame; and a release mechanism allowing the egress frame part to be manually detached from the second frame part, the release mechanism includes a slide bar shiftably carried by the second frame part for movement between a locked position and an unlocked position, and a rotatable handle carried by the first frame part for moving the slide bar between the locked position where the egress frame part is secured to the second frame part and unlocked position where the egress frame part can be manually pushed from the second frame part, the slide bar is shiftably carried by the skirt flange of the second frame part, the each of the first frame part and the second frame part has a peripheral sill flange and a peripheral skirt flange.

9. The egress window assembly of claim 8 wherein the egress frame part has a lock post extending through an opening in the second frame part and restrictively captured by the slide bar when the slide bar is in the locked position.

10. The egress window assembly of claim 8 wherein the handle extends through the skirt flange of the first frame part.

11. The egress window assembly of claim 8 wherein the slide bar is disposed between the first frame part and the second frame part.

12. The egress window assembly of claim 8 wherein the egress frame part carries a window pane.

13. The egress window assembly of claim 8 wherein the handle part includes a cam operatively engaged with the slide bar.

14. The egress window assembly of claim 13 wherein the slide bar has a pair of spaced lock flanges, the cam rotatably seated between the pair of spaced lock flanges to shift the slide bar between the locked position and the unlocked position when the handle is manually rotated.

15. An egress window assembly adapted to fit into a window opening in a planar panel having an interior panel side and an exterior panel side thereof, the egress window assembly comprising:

an interior frame part adapted to seat inside the window opening and to abut the interior panel side around the periphery of the window opening;

an exterior frame part adapted to seat inside the window opening and to abut against the exterior panel side around the periphery of the window opening, the exterior frame part mounted to the interior frame part with the panel interposed there between;

an egress frame part detachably mounted to the exterior frame part; and a release mechanism allowing the egress frame to be manually detached from the exterior frame part, the release mechanism includes a slide bar shiftably carried by the exterior frame part for movement between a locked position and an unlocked position, and a rotatable handle carried by the interior frame part for moving the slide bar between the locked position where the egress frame part is secured to the exterior frame part and unlocked position where the egress frame part can be manually pushed from the exterior frame part, each of the interior frame part and the exterior frame part has a peripheral sill flange and a peripheral skirt flange, the handle extends through the skirt flange of the interior frame part.

16. The egress window assembly of claim 15 wherein the egress frame part has a lock post extending through an opening in the exterior frame part and is restrictively captured by the slide bar when the slide bar is in the locked position.

17. The egress window assembly of claim 15 wherein the slide bar is disposed between the interior frame part and the exterior frame part.

18. The egress window assembly of claim 15 wherein the egress frame part carries a window pane.

19. The egress window assembly of claim 15 wherein the handle includes a cam operatively engaged with the slide bar.

20. The egress window assembly of claim 19 wherein the slide bar has a pair of spaced lock flanges, the cam rotatably seated between the pair of spaced lock flanges to shift the slide bar between the locked position and the unlocked position when the handle is manually rotated.

21. An egress window assembly adapted to fit into a window opening in a planar panel having an interior panel side and an exterior panel side thereof, the egress window assembly comprising:

a first frame part adapted to seat within the window opening and to abut against one of the interior panel side and the exterior panel side around the periphery of the window opening;

a second frame part adapted to seat within the window opening and to abut against the other of the interior panel side and the exterior panel side around the periphery of the window opening, the second frame part affixed to the first frame part with the panel interposed there between;

an egress frame part detachably mounted to the second frame; and a release mechanism allowing the egress frame part to be manually detached from the second frame part, the release mechanism includes a slide bar shiftably carried by the second frame part for movement between a locked position and an unlocked position, and a rotatable handle carried by the first frame part for moving the slide bar between the locked position where the egress frame part is secured to the second frame part and unlocked position where the egress frame part can be manually pushed from the second frame part, the each of the first frame part and the second frame part has a peripheral sill flange and a peripheral skirt flange, the handle part extends through the skirt flange of the first frame part.

22. The egress window assembly of claim 21 wherein the egress frame part has a lock post extending through an opening in the second frame part and restrictively captured by the slide bar when the slide bar is in the locked position.

23. The egress window assembly of claim 21 wherein the slide bar is disposed between the first frame part and the second frame part.

24. The egress window assembly of claim 21 wherein the egress frame part carries a window pane.

25. The egress window assembly of claim 21 wherein the handle part includes a cam operatively engaged with the slide bar.

26. The egress window assembly of claim 25 wherein the slide bar has a pair of spaced lock flanges, the cam part rotatably seated between the pair of spaced lock flanges to shift the slide bar between the locked position and the unlocked position when the handle part is manually rotated.

* * * * *